US011132130B2

(12) United States Patent
Eom et al.

(10) Patent No.: US 11,132,130 B2
(45) Date of Patent: Sep. 28, 2021

(54) SEGMENT CLEANING METHOD USING NON-VOLATILE RANDOM-ACCESS MEMORY AND MEMORY MANAGEMENT APPARATUS THEREOF

(71) Applicant: RESEARCH & BUSINESS FOUNDATION SUNGKYUNKWAN UNIVERSITY, Suwon-si (KR)

(72) Inventors: Young Ik Eom, Seoul (KR); Jong Gyu Park, Suwon-si (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 16/886,929

(22) Filed: May 29, 2020

(65) Prior Publication Data

US 2020/0387309 A1 Dec. 10, 2020

(30) Foreign Application Priority Data

Jun. 7, 2019 (KR) .......................... 10-2019-0067264

(51) Int. Cl.
*G06F 3/06* (2006.01)
(52) U.S. Cl.
CPC ............ *G06F 3/0608* (2013.01); *G06F 3/068* (2013.01); *G06F 3/0652* (2013.01)
(58) Field of Classification Search
CPC ........ G06F 3/0679; G06F 3/061; G06F 3/064; G06F 3/0652; G06F 3/0616; G06F 3/0608; G06F 3/068

USPC .......................................................... 711/103
See application file for complete search history.

(56) References Cited

U.S. PATENT DOCUMENTS

| | | | |
|---|---|---|---|
| 2016/0196216 A1* | 7/2016 | Lee ....................... | G06F 3/0689 711/170 |
| 2017/0199824 A1* | 7/2017 | Bennatan ............ | G06F 12/0246 |
| 2018/0210825 A1* | 7/2018 | Gim .................... | G06F 12/0246 |

OTHER PUBLICATIONS

Byun Hyunki, "Design and Implementation of a Hybrid Log-structured File System using Non-Volatile Memory", *Master's thesis of Computer Science and Engineering, Sogang University,* Dec. 2018 (pp. 1-56).

(Continued)

*Primary Examiner* — Hashem Farrokh
(74) *Attorney, Agent, or Firm* — NSIP Law

(57) ABSTRACT

In a computer system with a hybrid memory architecture consisting of a volatile main memory and a non-volatile main memory, there are provided a segment cleaning method for a storage file system and a memory management apparatus for implementing the same, the segment cleaning method comprising: selecting a victim segment in storage; copying valid blocks in the victim segment to the volatile main memory; and moving the copied valid blocks to the non-volatile main memory. This can effectively overcome cleaning overhead, thereby improving the I/O performance of applications and increasing the lifetime of storage.

16 Claims, 12 Drawing Sheets

(56) References Cited

OTHER PUBLICATIONS

Park Jonggyu et al., "An Efficient Cleaning Scheme for File Defragmentation on Log-Structured File System", *Korea Information Science Society, Journal of KIISE*, vol. 43, Issue 6, 2016, (pp. 627-635).

Park et al., "NV-Cleaning: An Efficient Segment Cleaning Scheme for a Log-Structured Filesystem with Hybrid Memory Architecture," IMCOM 2019:Proceedings of the 13th International Conference on Ubiquitous Information Management and Communication (IMCOM) 2019, Springer Link, Jun. 5, 2019, 11 pages.

* cited by examiner

SEGMENT CLEANING METHOD USING NON-VOLATILE RANDOM-ACCESS MEMORY AND MEMORY MANAGEMENT APPARATUS THEREOF

CROSS-REFERENCE TO RELATED APPLICATION

This application claims priority to and the benefit of Korean Patent Application No. 10-2019-0067264 filed in the Korean Intellectual Property Office on Jun. 7, 2019, the entire contents of which are incorporated herein by reference.

BACKGROUND OF THE DISCLOSURE

Field of the Disclosure

The present disclosure relates to segment cleaning for a storage file system.

Related Art

In the last decade, flash-based storage, such as SSD (Solid State Drive), has replaced conventional storage devices in various fields, from mobile systems to server systems, due to its low power consumption and high performance. However, since flash memory does not allow data overwriting, garbage collection (GC) is required to collect invalid space to reclaim free space. Also, flash memory has a limited number of erase cycles, and thus we should avoid intensive writes to the same location.

Log-structured file systems (LFS) have gracefully addressed the aforementioned problems of flash memory by adopting log-structuring. Log-structuring transforms host I/O operations into sequential ones, in order to eliminate random writes, which are harmful to flash memory. Besides, log-structuring eliminates redundant writes of journaling file systems by prohibiting over-writing, thereby reducing the number of writes in the system.

However, when a log-structured file system (LFS) handles updates, it invalidates the previous data and writes the new data into a new space, because it does not allow overwriting. Therefore, the log-structured file system (LFS) needs to collect the invalidated data, in order to reclaim free space. This is referred to as segment cleaning. During a segment cleaning process, the log-structured file system (LFS) selects a victim segment and copies valid blocks in the victim segment into a new segment. However, since the log-structured file system (LFS) temporarily suspends I/O operations of user processes during the cleaning process, segment cleaning may degrade the I/O performance of user processes, and additional writes may shorten the lifetime of flash storage.

SUMMARY OF THE DISCLOSURE

The present disclosure provides a segment cleaning method for a storage file system and a memory management apparatus for implementing the same, which can improve the I/O performance of applications and increase the lifetime of storage by effectively overcoming cleaning overhead.

According to one aspect of the present disclosure, there is provided a segment cleaning method for a file system, in a computer system with a hybrid main memory having a volatile main memory with a first speed and a non-volatile main memory with a second speed, wherein the second speed is less than or equal to the first speed, the segment cleaning method comprising: selecting a victim segment in storage; copying valid blocks in the victim segment to the volatile main memory; and moving the copied valid blocks to the non-volatile main memory.

The file system may be a log-structured file system.

The storage may be a flash memory-based storage device.

The selecting of a victim segment may comprise selecting a segment with the smallest number of valid blocks as the victim segment.

Alternatively, the selecting of a victim segment may comprise selecting the victim segment according to the date of data creation.

The segment cleaning method may further comprise moving the valid blocks moved to the non-volatile main memory to a new segment in the storage at idle times.

The segment cleaning method may further comprise, when a new data update instruction is issued to the non-volatile main memory, performing in-place writes to the valid blocks moved to the non-volatile main memory.

According to another aspect of the present disclosure, there is provided a memory management apparatus for a file system, in a computer system with a hybrid main memory having a volatile main memory with a first speed and a non-volatile main memory with a second speed, wherein the second speed is less than or equal to the first speed, the memory management apparatus comprising: an interface module for interfacing with a storage device; and a file system module for selecting a victim segment in the storage device, copying valid blocks in the victim segment to the volatile main memory, and moving the copied valid blocks to the non-volatile main memory.

The file system may be a log-structured file system.

The storage may be a flash memory-based storage device.

The victim segment may be a segment with the smallest number of valid blocks.

Alternatively, the victim segment may be selected according to the date of data creation.

The file system module may move the valid blocks moved to the non-volatile main memory to a new segment in the storage at idle times.

When a new data update instruction is issued to the non-volatile main memory, the file system module may perform in-place writes to the valid blocks moved to the non-volatile main memory.

DESCRIPTION OF EXEMPLARY EMBODIMENTS

Hereinafter, a segment cleaning method for a log-structured file system using non-volatile random-access memory (NVRAM) according to an exemplary embodiment of the present disclosure will be described in explicit detail with reference to the accompanying drawings so that a person skilled in the art can readily practice the present disclosure.

First of all, prior to describing segment cleaning methods according to exemplary embodiments of the present disclosure, a log-structured file system adopting the present disclosure, a conventional segment cleaning method, and a hybrid memory architecture will be described.

Flash memory has been used as storage devices for mobile devices such as smartphones and tablets due to its low power consumption and high performance. Moreover, flash memory-based SSDs (solid-state drives) are used as replacements for HDDs (hard disk drives) in fields from personal computers to servers, due to the decline in price and performance optimization.

However, unlike HDD, flash memory cannot be overwritten, so it invalidates the previous page and writes to a free page when data is changed. Frequent invalidations and write operations cause a lack of free space in the flash memory, and garbage collection (GC) is therefore needed. The garbage collection (GC) incurs additional write operations for moving valid pages to a new block, which lowers the performance of the flash memory.

Figure 1:
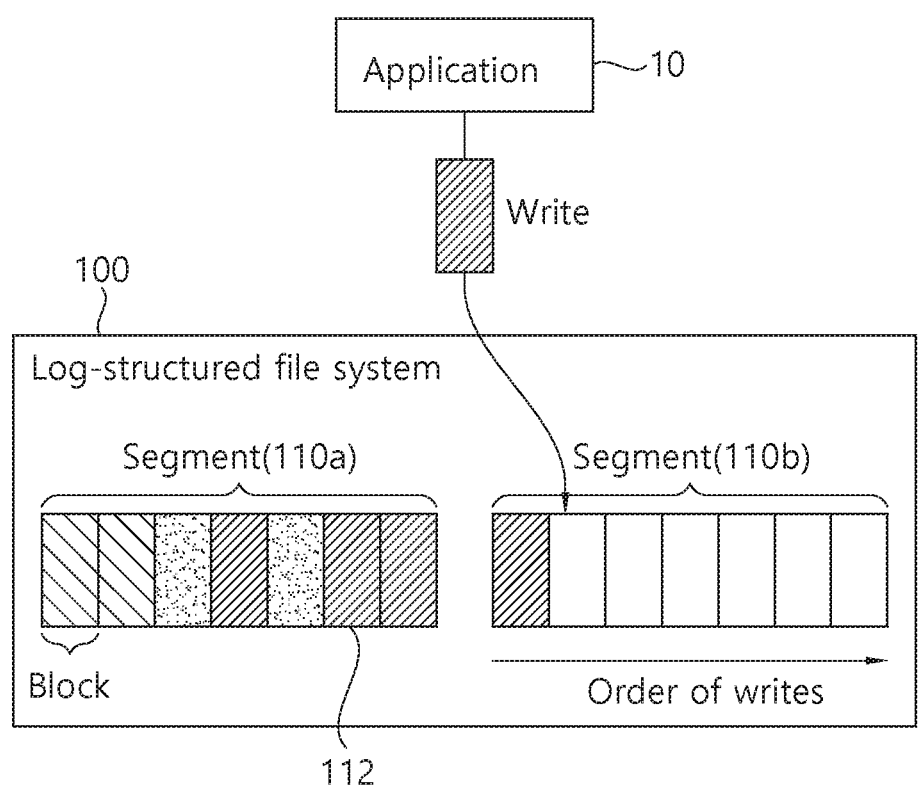
FIG. 1 is a conceptual diagram for explaining the concept and writing scheme of a log-structured file system.

FIG. 1 is a conceptual diagram for explaining the concept and writing scheme of a log-structured file system (LFS) 100.

The log-structured file system (LFS) 100 is one of the methods for alleviating the aforementioned disadvantages of flash memory, which divides up a disk into segment 110a and 110b regardless of the types of blocks 112, unlike a file system such as EXT4 which divides areas according to the types of blocks. The segments 110a and 110b each consist of a number of blocks 112, and the types of the blocks 112 include inode blocks representing information about the file, data blocks representing data in the file, and indirect blocks representing the locations of the data blocks.

However, when the log-structured file system LFS 100 updates existing data, it invalidates the data and stores new data in the block next to the last allocated block. That is, as shown in FIG. 1, write operations are performed in a set order of writes. Since the log-structured file system (LFS) 100 does not overwrite existing data, it should collect invalid blocks and convert them into free blocks. The log-structured file system (LFS) 100 performs this process in segments. This is referred to as segment cleaning.

Figure 2:
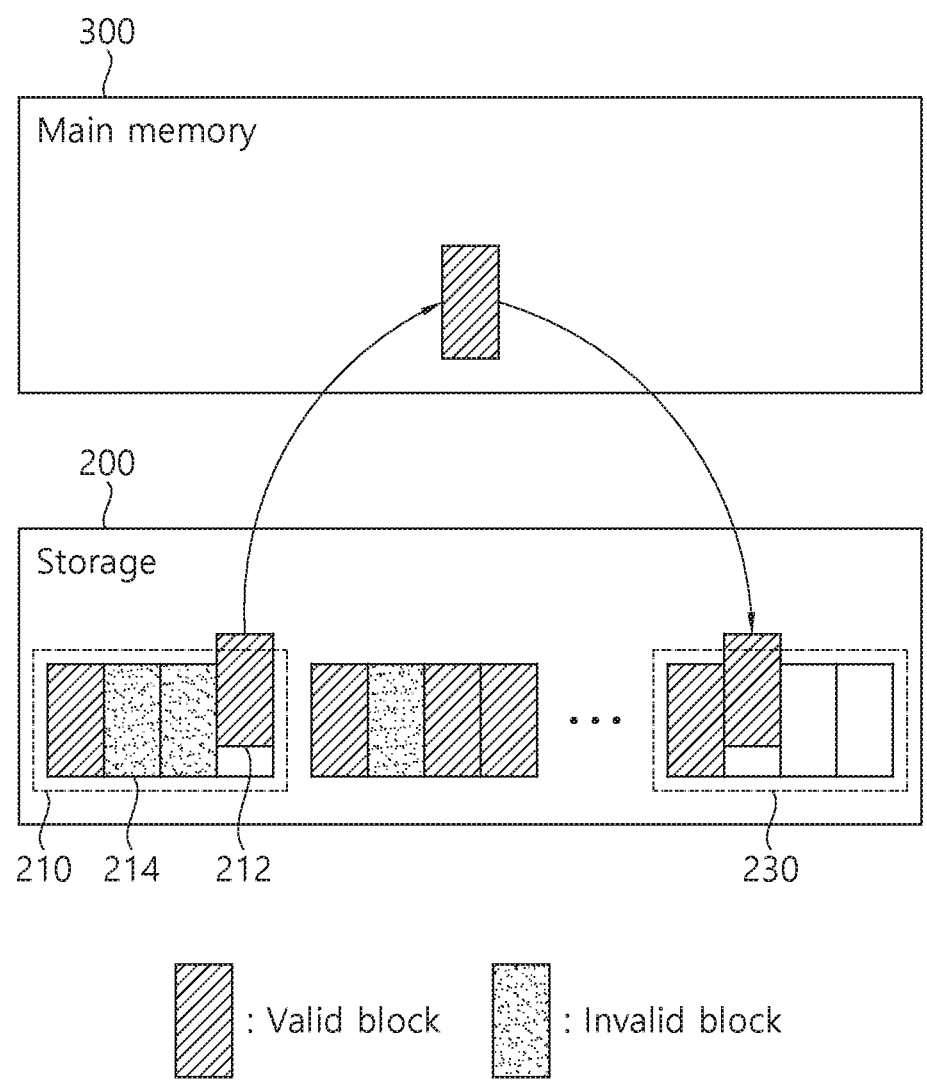
FIG. 2 is a conceptual diagram for explaining a conventional segment cleaning method.

FIG. 2 is a conceptual diagram for explaining a conventional segment cleaning method.

When there is not enough free space in storage 200, the log-structured file system (LFS) 100 suspends application I/O and performs segment cleaning.

First, the log-structured file system (LFS) 100 selects a victim segment from a number of segments in the storage 200.

Second, the log-structured file system (LFS) 100 checks the validity of each block in the victim segment and copies valid blocks 212 to a main memory 300.

Third, the log-structured file system (LFS) 100 moves the valid blocks 212 to a new segment 230 in the storage 200.

Afterwards, the log-structured file system (LFS) 100 sets the victim segment as a free segment and resumes application I/O.

In the above-described conventional segment cleaning method, application I/O is suspended during the segment cleaning process, and additional I/O operations are incurred by the movement of the valid blocks 212, thereby degrading the I/O performance of the whole system.

Figure 3A:
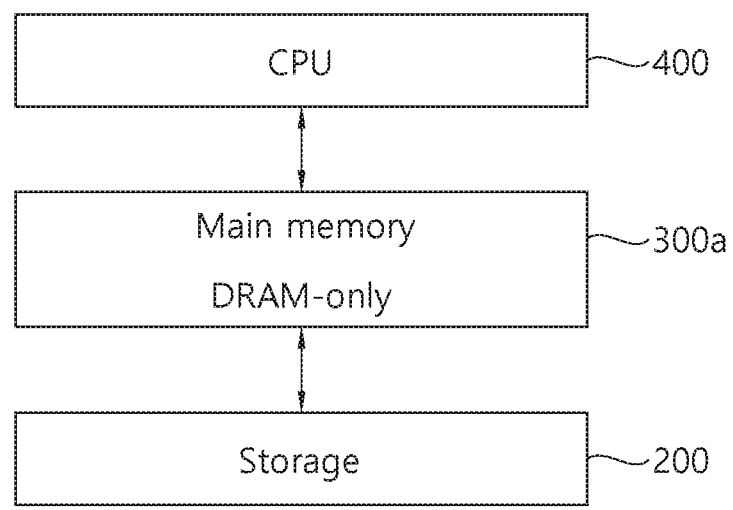
FIG. 3A is a conceptual diagram showing a memory architecture in which the main memory consists only of DRAM.
Figure 3B:
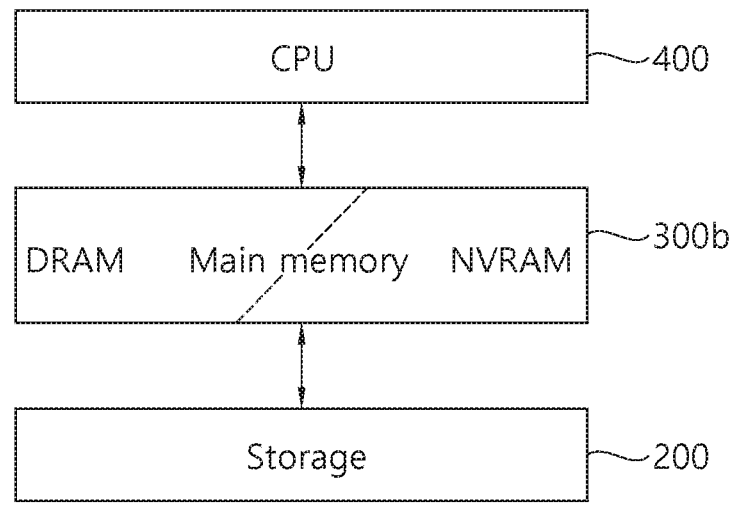
FIG. 3B is a conceptual diagram showing a hybrid memory architecture in which the main memory consists of DRAM and NVRAM.

FIGS. 3A and 3B are conceptual diagrams respectively showing a memory architecture in which the main memory consists only of DRAM and a hybrid memory architecture in which the main memory consists of DRAM and NVRAM.

The storage 200 refers to an auxiliary storage device for a computer system. For example, the storage 200 may be flash memory, SSD, or HDD.

The main memory 300a and 300b refers to a primary storage device for a computer system. For example, it may be ROM (read only memory) or RAM (random-access memory).

A central processing unit (CPU) 400 refers to a computer's controller that controls the computer system and performs a program's operations.

In FIG. 3A, the DRAM (dynamic random-access memory) is an example of volatile memory which loses its stored data when the power supply is interrupted, which may be replaced with other types of volatile memory.

Meanwhile, as shown in FIG. 3B, a main memory 300b in the hybrid memory architecture consists of a volatile main memory with a first speed and a non-volatile main memory with a second speed. Here, the second speed is less than or equal to the first speed.

NVRAM (non-volatile random-access memory) refers to random-access memory that retains its stored data even when the power supply is interrupted. NVRAM has features such as high speed, low latency, byte addressability, and non-volatility. Examples of NVRAM may include MRAM (Magnetoresistive RAM), STT-MRAM (Spin Transfer Torque MRAM), PCM (Phase Change Memory), RRAM (Resistive RAM), and FeRAM (Ferroelectric RAM).

Table 1 is a table comparing the features of DRAM, MRAM, PCM, and NAND flash memory. NVRAM is similar to flash memory in that it is non-volatile memory which retains stored data even after the power supply is interrupted, but is similar in nature to DRAM in terms of write and read speeds.

TABLE 1

| Technology | DRAM | MRAM | PCM | NAND |
|---|---|---|---|---|
| Non-volatility | No | Yes | Yes | Yes |
| Endurance | $10^{15}$ | $10^{12}$ | $10^{8}$ | $10^{3}$ |
| Write Time | 10 ns | ~10 ns | ~75 ns | 10 μs |
| Read Time | 10 ns | 10 ns | 20 ns | 25 μs |

Figure 4:
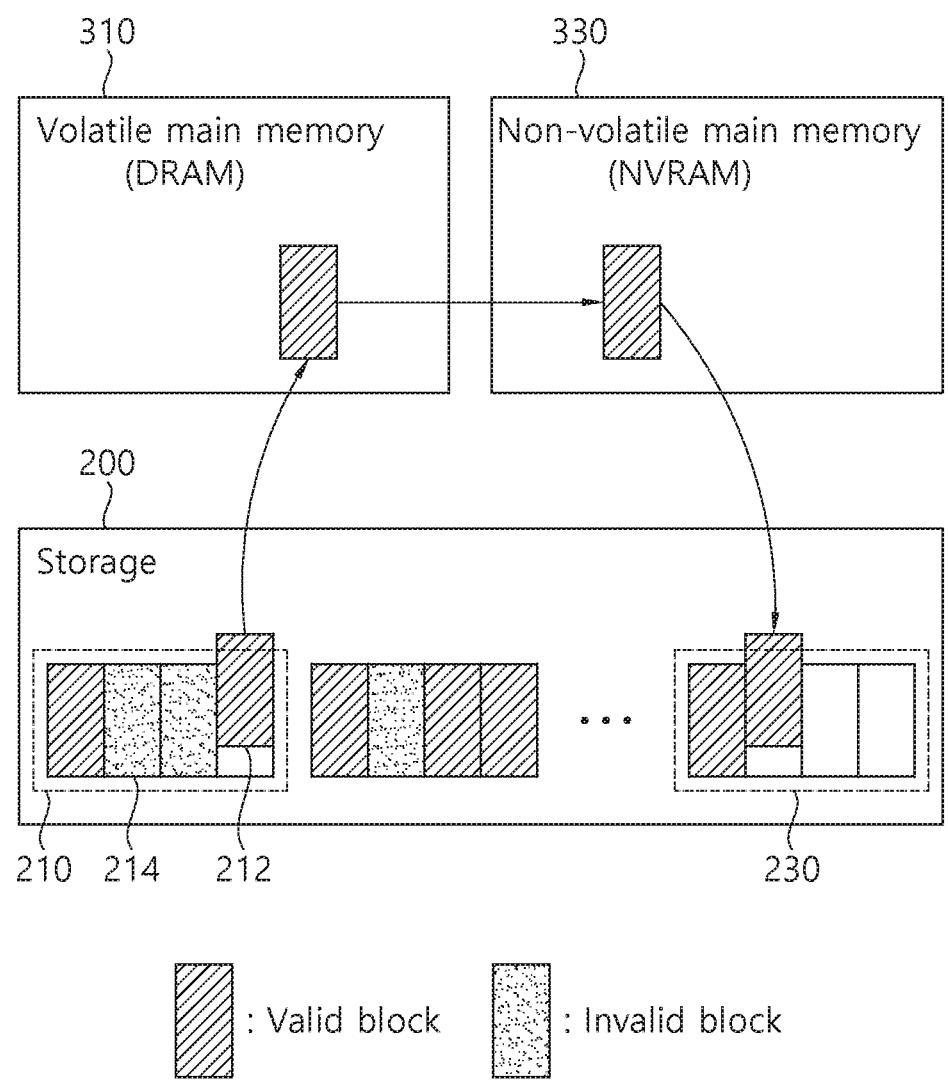
FIG. 4 is a conceptual diagram for explaining a segment cleaning method according to an exemplary embodiment of the present disclosure.

FIG. 4 is a conceptual diagram for explaining a segment cleaning method according to an exemplary embodiment of the present disclosure.

First, the log-structured file system (LFS) 100 suspends application I/O and selects a victim segment from a number of segments in the storage 200.

Second, the log-structured file system (LFS) 100 checks the validity of each block in the victim segment and copies valid blocks 212 to a volatile main memory 310.

Third, the log-structured file system (LFS) 100 moves the valid blocks 212 to a non-volatile main memory 330.

Afterwards, the log-structured file system (LFS) 100 resumes application I/O.

Since the non-volatile main memory 330 has shorter write time than the storage 200, the segment cleaning method according to the exemplary embodiment of the present disclosure can finish segment cleaning faster than the conventional segment cleaning method. Thus, application I/O can be resumed faster than in the conventional segment cleaning method.

In order to handle new application I/O operations, the valid blocks 212 need to be within a non-volatile storage device. That is, they should be put in a situation where data can be restored even when the power supply to the system is interrupted. Thus, by applying a hybrid memory architecture in the segment cleaning method according to the exemplary embodiment of the present disclosure, the valid blocks 212 can be stored fast and safe within the non-volatile main memory 330, even without being moved to the storage 200 which is relatively slow, thereby resuming the handling of new application I/O operations within a short time.

Fourth, the log-structured file system (LFS) 100 may move the valid blocks 212 to a new segment 230 in the storage 200 at idle times when there are no application I/O operations.

Figure 5:
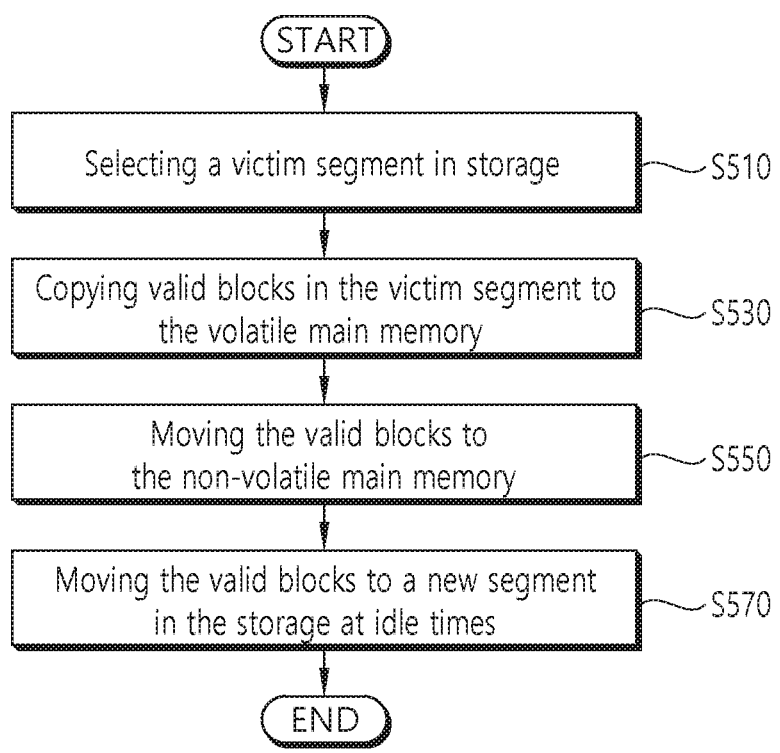
FIG. 5 is a flowchart of a segment cleaning method according to an exemplary embodiment of the present disclosure.

FIG. 5 is a flowchart of a segment cleaning method according to an exemplary embodiment of the present disclosure.

First of all, a victim segment 210 is selected in the storage 200 (S510).

To select the victim segment 210, various policies for reducing cleaning overhead may be used—for example, a greedy policy or cost-benefit policy. In the greedy policy, a segment having the smallest number of valid blocks 212 is selected as the victim segment 210. In the cost-benefit policy, the victim segment 210 is selected according to the date of data creation under the assumption that old data is less likely to be invalidated.

Next, the valid blocks 212 in the victim segment 210 are copied to the volatile main memory 310 (S530).

Next, the valid blocks 212 copied to the volatile main memory 310 are moved to the non-volatile main memory 330 (S550). Afterwards, application I/O is resumed as described above.

The valid blocks 212 in the non-volatile main memory 330 may be moved to a new segment 230 in the storage 200 at idle times when there are no application I/O operations (S570).

Figure 6A:
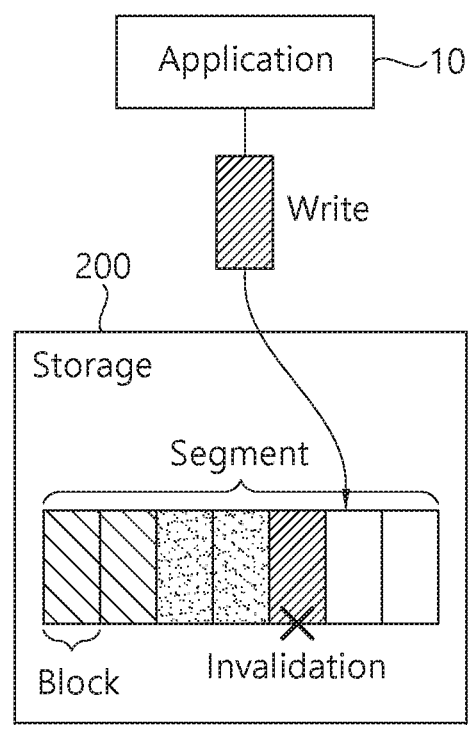
FIG. 6A is a conceptual diagram showing how writes are handled when there is a new data update instruction, in the conventional segment cleaning method.
Figure 6B:
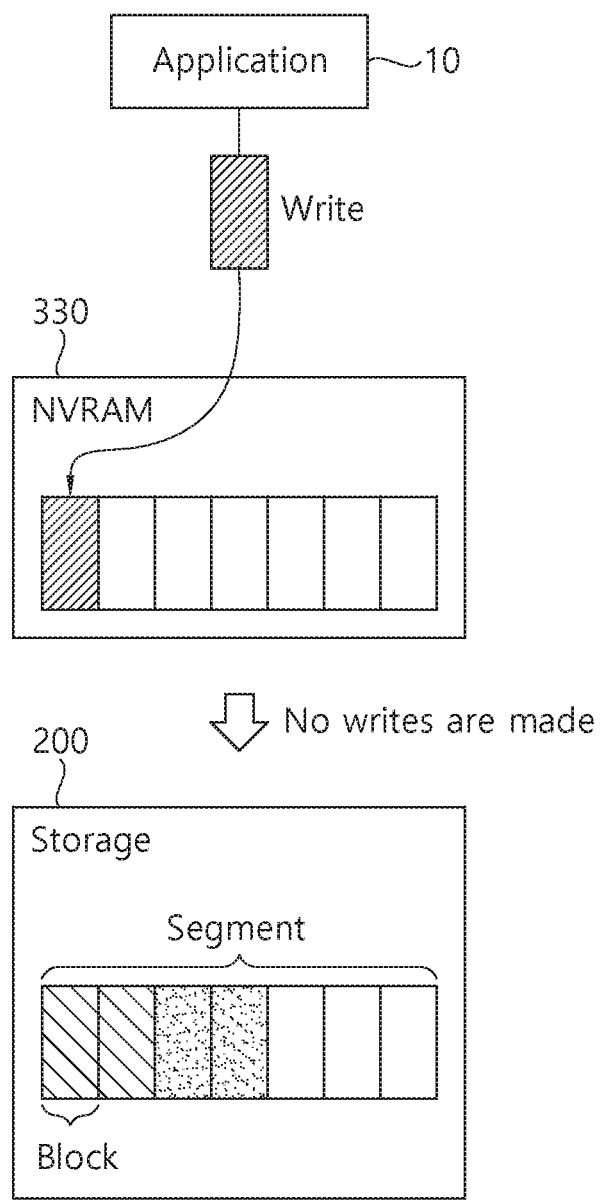
FIG. 6B is a conceptual diagram showing how writes are handled when there is a new data update instruction, in a segment cleaning method according to an exemplary embodiment of the present disclosure.

Alternatively, as shown in FIG. 6B, if there is a new data update instruction after the step S550, the valid blocks 212 moved to the non-volatile main memory 330 may be invalidated, and in-place writes may be performed. This will be described in detail with reference to FIGS. 6A and 6B.

FIG. 6A is a conceptual diagram showing how writes are handled when there is a new data update instruction, in the conventional segment cleaning method.

As described above, in the conventional segment cleaning method, a valid block 212 is stored in the storage 200. Afterwards, if a write operation for the block is issued from an application 10, the log-structured file system (LFS) 100 invalidates the previous block and performs a write operation on a new block, because it does not allow overwriting. This increases the number of writes to the storage 200, thereby having adverse effects on the I/O performance of the application and the lifetime of the storage 200.

FIG. 6B is a conceptual diagram showing how writes are handled when there is a new data update instruction, in a segment cleaning method according to an exemplary embodiment of the present disclosure.

In the segment cleaning method according to the exemplary embodiment of the present disclosure, a valid block 212 is moved to the non-volatile main memory 330 during a cleaning process. Afterwards, if a write operation for the block is issued from an application 10, NVRAM may perform an in-place write because it allows overwriting, and does not incur a write operation to the storage 200. Afterwards, two write operations (the write operation S570 incurred by the segment cleaning and a write operation incurred by the new data update instruction) are handled at a time, even if the step S570 is performed. Thus, the number of write operations to the storage 200 can be reduced.

To verify the performance of the segment cleaning method according to the exemplary embodiment of the present disclosure, a comparison test with the conventional segment cleaning method was conducted. The test was carried out in the environment specified in Table 2.

TABLE 2

| Processor | Intel i7-3770k |
|---|---|
| Memory | 8 GB |
| Storage | 128 GB Samsung 850 Pro SSD |
| Operating System | Ubuntu 14.04 |
| Kernel Version | Linux Kernel 4.15.0 |
| Benchmark | IOzone |

Figure 7:
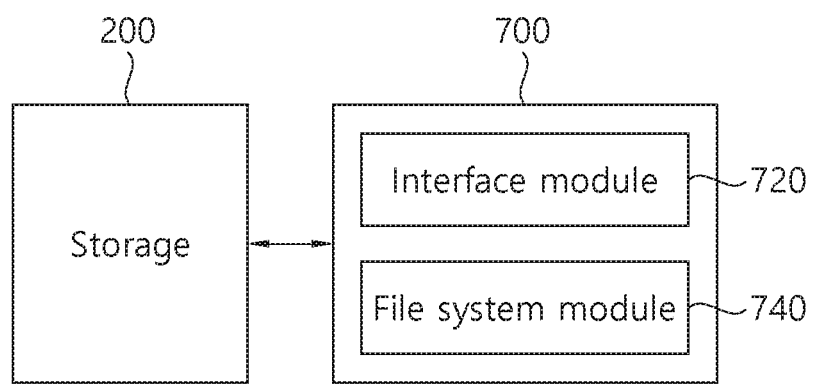
FIG. 7 is a block diagram showing a memory management apparatus for implementing a segment cleaning method according to an exemplary embodiment of the present disclosure.

FIG. 7 is a block diagram showing a memory management apparatus for implementing a segment cleaning method according to an exemplary embodiment of the present disclosure.

The storage 200 refers to an auxiliary storage device for a computer system. For example, the storage 200 may be flash memory, SSD, or HDD.

The memory management apparatus 700 comprises an interface module 720 and a file system module 740.

The interface module 720 may support various protocols used to send and receive data, and may comprise a logic for handling data transmission and reception.

The file system module 740 sends and receives data to and from the storage 200 via the interface module 720, and performs the above-described segment cleaning method.

Figure 8:
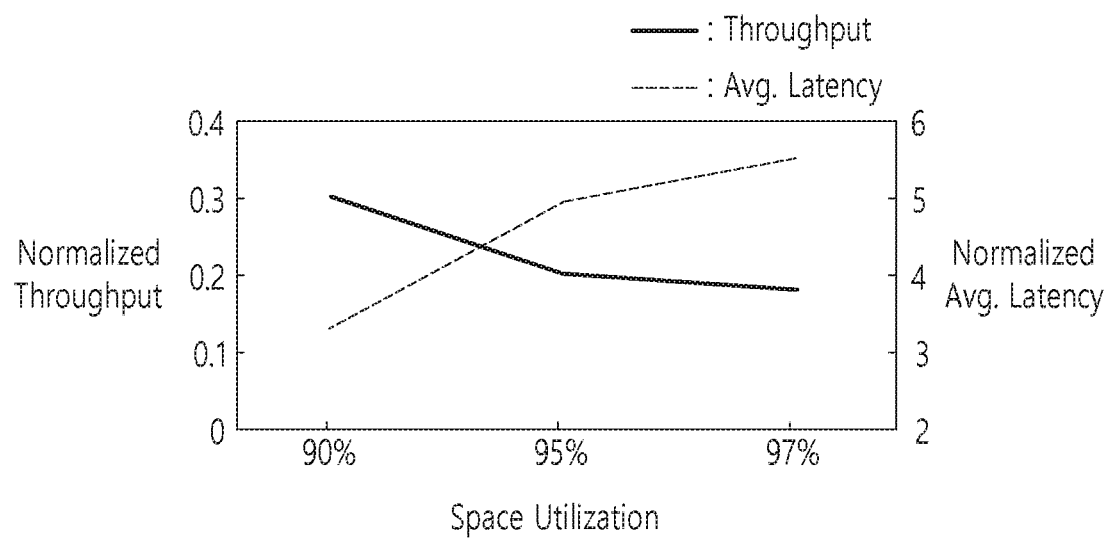
FIG. 8 is a graph showing results of a test conducted to measure a performance drop caused by cleaning relative to file system utilization.

FIG. 8 is a graph showing results of a test conducted to measure a performance drop caused by cleaning relative to file system utilization.

This test compares the throughput and latency measured when sequential writes were performed, while increasing the space utilization from 90% to 97%. The test results show that, when the space utilization was 97%, the throughput dropped by about 82% and the latency increased about 5.5 times, compared to when it was 90%. This is because the increase in space utilization caused a lack of free space and therefore led to frequent cleaning, causing a decline in I/O performance.

Figure 9:
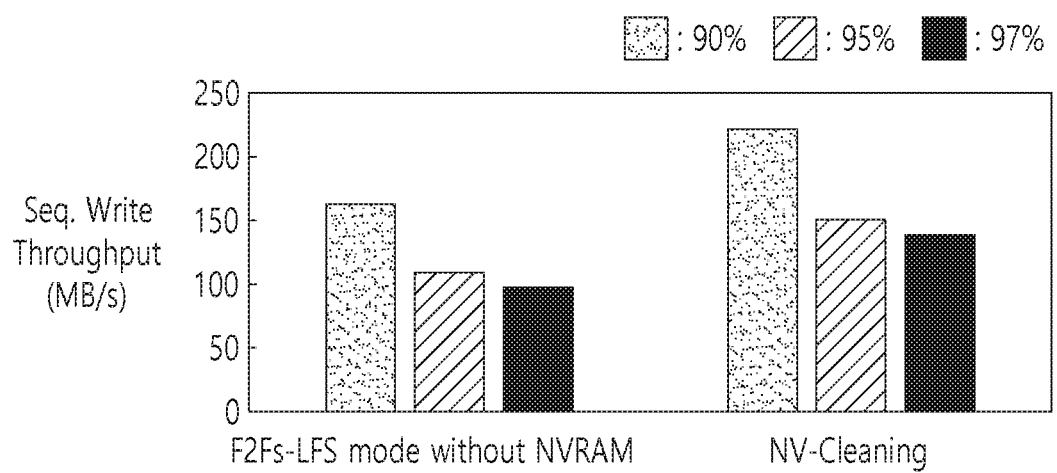
FIG. 9 is a graph showing a comparison of the sequential write throughput between a segment cleaning method according to an exemplary embodiment of the present disclosure and the conventional segment cleaning method.

FIG. 9 is a graph showing a comparison of the sequential write throughput between a segment cleaning method according to an exemplary embodiment of the present disclosure and the conventional segment cleaning method.

In the proposed segment cleaning method, the throughput increased by 39% on average and up to 41%, compared to the conventional segment cleaning method. While the proposed method allows immediate handling of application I/O since the cleaning process is made faster by moving valid blocks 212 to NVRAM, the conventional method cannot handle application I/O due to the long cleaning process time because the valid blocks 212 are stored in the storage 200.

Figure 10:
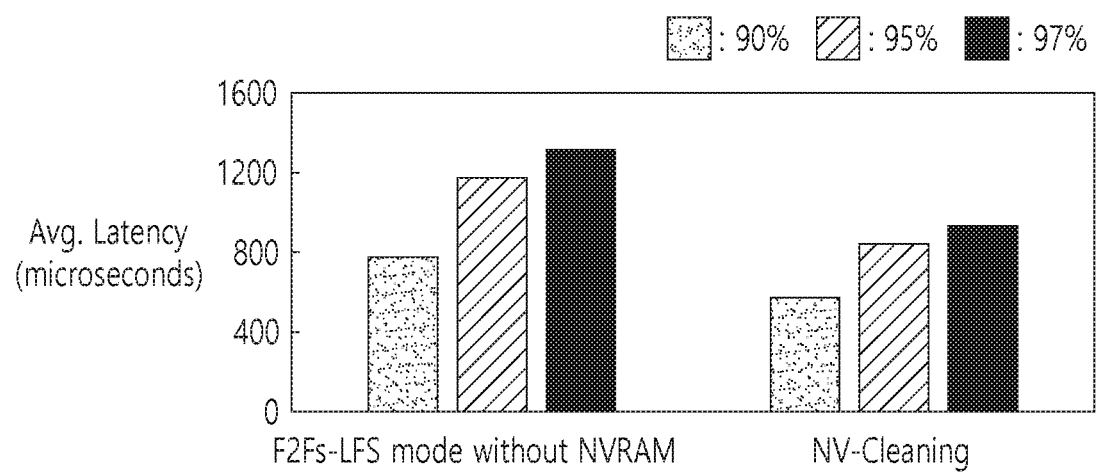
FIG. 10 is a graph showing a comparison of the average latency between a segment cleaning method according to an exemplary embodiment of the present disclosure and the conventional segment cleaning method.

FIG. 10 is a graph showing a comparison of the average latency between a segment cleaning method according to an exemplary embodiment of the present disclosure and the conventional segment cleaning method.

For the same reason as described above with reference to FIG. 8, the proposed segment cleaning method showed a reduction in latency by 28% on average and up to 30%, compared to the conventional segment cleaning method.

The segment cleaning method and memory management apparatus for implementing the same according to the exemplary embodiments of the present invention can improve the I/O performance of applications, because application I/O is resumed fast by temporarily storing valid block copying overhead, incurred by a log-structured file system, in NVRAM. Moreover, when an update operation for data stored in the NVRAM is issued, the data in the NVRAM is invalidated, thereby reducing the total number of I/O operations going to the storage and increasing the lifetime of the storage.

The advantageous effects of the present disclosure are not limited to the above-described ones, but a person having ordinary skill in the art to which the present disclosure pertains will understand that the present disclosure can be modified and altered in various ways without departing from the spirit and technical scope as defined by the following claims.

What is claimed is:

1. A segment cleaning method for a file system, in a computer system with a hybrid main memory having a volatile main memory with a first speed and a non-volatile main memory with a second speed, wherein the second speed is less than or equal to the first speed, the segment cleaning method comprising:
   selecting a victim segment in storage;
   copying valid blocks in the victim segment to the volatile main memory; and
   moving the copied valid blocks to the non-volatile main memory.

2. The segment cleaning method of claim 1, wherein the file system is a log-structured file system.

3. The segment cleaning method of claim 1, wherein the storage is a flash memory-based storage device.

4. The segment cleaning method of claim 1, wherein the selecting of a victim segment comprises selecting a segment with the smallest number of valid blocks as the victim segment.

5. The segment cleaning method of claim 1, wherein the selecting of a victim segment comprises selecting the victim segment according to the date of data creation.

6. The segment cleaning method of claim 1, further comprising moving the valid blocks moved to the non-volatile main memory to a new segment in the storage at idle times.

7. The segment cleaning method of claim 1, further comprising, when a new data update instruction is issued to the non-volatile main memory, performing in-place writes to the valid blocks moved to the non-volatile main memory.

8. The segment cleaning method of claim 7, further comprising moving the valid blocks moved to the non-volatile main memory to a new segment in the storage at idle times.

9. A memory management apparatus for a file system, in a computer system with a hybrid main memory having a volatile main memory with a first speed and a non-volatile main memory with a second speed, wherein the second speed is less than or equal to the first speed, the memory management apparatus comprising:
   an interface module for interfacing with a storage device; and
   a file system module for selecting a victim segment in the storage device, copying valid blocks in the victim segment to the volatile main memory, and moving the copied valid blocks to the non-volatile main memory.

10. The memory management apparatus of claim 9, wherein the file system is a log-structured file system.

11. The memory management apparatus of claim 9, wherein the storage is a flash memory-based storage device.

12. The memory management apparatus of claim 9, wherein the victim segment is a segment with the smallest number of valid blocks.

13. The memory management apparatus of claim 9, wherein the victim segment is selected according to the date of data creation.

14. The memory management apparatus of claim 9, wherein the file system module moves the valid blocks moved to the non-volatile main memory to a new segment in the storage at idle times.

15. The memory management apparatus of claim 9, wherein, when a new data update instruction is issued to the non-volatile main memory, the file system module performs in-place writes to the valid blocks moved to the non-volatile main memory.

16. The memory management apparatus of claim 15, wherein moves the valid blocks moved to the non-volatile main memory to a new segment in the storage at idle times.

* * * * *